US012797841B2

(12) United States Patent
Ma

(10) Patent No.: US 12,797,841 B2
(45) Date of Patent: Nov. 17, 2026

(54) FIXED VOLUME PIPETTE

(71) Applicant: JiangSu Kehua Medical Instrument Technology Co., Ltd., Dongtai City (CN)

(72) Inventor: Ronghua Ma, Dongtai City (CN)

(73) Assignee: JiangSu Kehua Medical Instrument Technology Co, Ltd. (CN)

( * ) Notice: Subject to any disclaimer, the term of this patent is extended or adjusted under 35 U.S.C. 154(b) by 976 days.

(21) Appl. No.: 18/094,581

(22) Filed: Jan. 9, 2023

(65) Prior Publication Data

US 2023/0278025 A1 Sep. 7, 2023

(30) Foreign Application Priority Data

Mar. 7, 2022 (CN) ......................... 202210213894.7
Jun. 29, 2022 (CN) ......................... 202210750484.6

(51) Int. Cl.
*B01L 3/02* (2006.01)

(52) U.S. Cl.
CPC ....... *B01L 3/021* (2013.01); *B01L 2300/0832* (2013.01); *B01L 2300/12* (2013.01); *B01L 2400/0481* (2013.01)

(58) Field of Classification Search
None
See application file for complete search history.

(56) References Cited

U.S. PATENT DOCUMENTS 2,728,232 A * 12/1955 Bremmer ................ B01L 3/021 422/922
3,748,909 A * 7/1973 Kuo ........................ B01L 3/021 422/922
3,881,527 A * 5/1975 Shapiro ................. B01L 3/0282 422/922
3,938,392 A 2/1976 Rodrigues
4,563,104 A * 1/1986 Saint-Amand .......... B01L 3/021 401/139
4,563,332 A * 1/1986 Mitchell ................. B01L 3/021 422/922

(Continued)

FOREIGN PATENT DOCUMENTS

CN 105498877 A 4/2016
CN 205981787 U 2/2017

(Continued)

OTHER PUBLICATIONS

"Extended European Search Report for European Application No. 22214295.2, dated Feb. 9, 2023, 4 pages".

(Continued)

*Primary Examiner* — Brian R Gordon
(74) *Attorney, Agent, or Firm* — Billion & Armitage

(57) ABSTRACT

Disclosed in the present disclosure is a fixed volume pipette, including: a top bulb, a connecting tube, an overflow-storing tube, and a liquid-sucking tube; in the present disclosure, the upper and lower ends of the liquid-sucking tube are respectively designed as a conical structure, wherein the upper end inner cavity of the liquid-sucking tube is in a conical structure tapering from the bottom up, and the lower end inner cavity of the liquid-sucking tube is in a conical structure tapering from the top down.

9 Claims, 7 Drawing Sheets

(56) References Cited

U.S. PATENT DOCUMENTS

| | | | | | |
|---|---|---|---|---|---|
| 4,779,768 | A * | 10/1988 | St. Amand | B01L 3/021 | |
| | | | | 222/209 | |
| D299,956 | S * | 2/1989 | Saint-Amand | D24/115 | |
| 5,916,813 | A * | 6/1999 | Gorog | G01N 33/86 | |
| | | | | 73/64.41 | |
| 6,803,021 | B1 * | 10/2004 | Bertling | B01L 3/022 | |
| | | | | 422/514 | |
| 8,486,347 | B2 * | 7/2013 | Tajima | B01L 3/021 | |
| | | | | 422/69 | |
| 12,037,166 | B2 * | 7/2024 | Hwang | A45D 34/04 | |
| 2010/0326214 | A1 * | 12/2010 | Hornes | B01L 3/021 | |
| | | | | 73/864.01 | |
| 2011/0129396 | A1 * | 6/2011 | Fish | B01L 3/022 | |
| | | | | 422/507 | |
| 2011/0212482 | A1 * | 9/2011 | Jangam | B01L 3/5027 | |
| | | | | 435/306.1 | |
| 2014/0186235 | A1 * | 7/2014 | Kwak | B01L 3/021 | |
| | | | | 422/520 | |
| 2016/0332157 | A1 * | 11/2016 | Uda | B01L 3/563 | |
| 2016/0339421 | A1 * | 11/2016 | Ma | B01L 3/021 | |
| 2017/0036203 | A1 * | 2/2017 | Le | B01L 3/021 | |
| 2021/0039095 | A1 * | 2/2021 | Sharma | B01L 3/50273 | |
| 2022/0003586 | A1 * | 1/2022 | Lai | G01F 11/084 | |
| 2022/0134325 | A1 * | 5/2022 | Hilgenberg | B01L 3/0213 | |
| | | | | 73/864.14 | |
| 2022/0346371 | A1 * | 11/2022 | Carasa Ruiz | B01L 3/021 | |

FOREIGN PATENT DOCUMENTS

| | | | |
|---|---|---|---|
| CN | 108786948 | A | 11/2018 |
| CN | 209173956 | U | 7/2019 |
| CN | 214863667 | U | 11/2021 |
| JP | S5124310 | A | 2/1976 |
| JP | Sho 54-15587 | | 2/1979 |
| JP | 3229722 | U | 11/2020 |

OTHER PUBLICATIONS

"Notice of Refusal for Japanese Patent Application No. 2022-192929, dated Apr. 2, 2024, 5 pages".
"Office Action received for Korean Application No. 10-2023-0005186, dated Oct. 14, 2025, 4 pages".
"Office Action received for Chinese Application No. 2022107504846, dated Sep. 28, 2023, 10 pages".

* cited by examiner

FIXED VOLUME PIPETTE

CROSS-REFERENCE TO RELATED APPLICATION

This application claims benefit of CN application No. 202210750484.6 filed on Jun. 29, 2022, and CN application No. 202210213894.7 filed on Mar. 7, 2022. CN application No. 202210750484.6 and CN application No. 202210213894.7 are incorporated herein by reference. A claim of priority is made.

TECHNICAL FIELD

The present disclosure relates to a fixed volume pipette.

BACKGROUND

Fixed volume pipette is a step required to be implemented in all the physical, chemical, and biological laboratories all the time. For large-volume pipetting, glass or plastic pipettes are used domestically and at abroad. As shown in FIG. 1, the core structure of such a pipette generally comprises a bulb 91, an air vent tube 92, a liquid-storing tube 93, and a capillary tube 94. The lower end of the bulb 91 is in connection with the liquid-storing tube 93 via the air vent tube 92, and the upper end of the capillary tube 94 is inserted into and fixedly connected with the internal of the lower end of the liquid-storing tube 93. In this way, by lightly squeezing the bulb 91, immersing the capillary tube 94 into a liquid to be collected, and then releasing the bulb 91, the liquid is enabled to enter the capillary tube 94, while excess liquid at the upper end of the capillary tube 94 will overflow into and be stored in the liquid-storing tube 93. Fixed volume collection is realized in this way. But due to the acting force on the liquid surface and solid surface, the liquid sucked into the capillary tube has a convex or concave structure at the openings on both ends of the capillary tube, which results in inconformity of the actually collected liquid volume with the internal volume of the capillary tube. Out of this reasoning, the liquid collection accuracy is not high and cannot meet the standards in some fields requiring high accuracy. Moreover, existing capillary tubes generally are in an integrated structure, and when it is required to change the capacity volume to be collected, the whole capillary tube and even the whole product must be replaced, which makes the actual use very inflexible. Furthermore, if an operator squeezes the bulb 91 with an excessively applied force, the liquid would be directly sucked into the bulb 91 located on the top, causing that it is unavailable for subsequent operations.

SUMMARY

In view of the above shortcomings present in the prior art, the problem to be solved by the present disclosure is to provide a fixed volume pipette, which realizes high liquid collection accuracy, enables the capacity to be conveniently changed, and reduces the probability of liquid flowing into the bulb due to excessive force application.

In order to solve the problem mentioned above, the following technical solution is adopted in the present disclosure.

A fixed volume pipette comprises: a top bulb, a connecting tube, an overflow-storing tube, and a liquid-sucking tube, wherein the lower end of the top bulb is connected and assembled with the connecting tube, the lower end of the connecting tube is connected and assembled with the overflow-storing tube, and the connecting tube is connected between the top bulb and the overflow-storing tube; a liquid-sucking tube is inserted into the internal of the lower end of the overflow-storing tube in a sealed manner; the upper end of the liquid-sucking tube is inserted and connected in the middle of the internal of the overflow-storing tube, and the lower end of the liquid-sucking tube is located under the overflow-storing tube; an annular cavity is enclosed by the circumferential outside of the upper end of the liquid-sucking tube and the circumferential inside of the lower end of the overflow-storing tube; and the inner cavities at upper and lower ends of the liquid-sucking tube respectively are in a conical structure, wherein the upper end inner cavity of the liquid-sucking tube is in a conical structure tapering from the bottom up, and the lower end inner cavity of the liquid-sucking tube is in a conical structure tapering from the top down.

The liquid-sucking tube is in an integrated structure; and the circumferential outside of the upper end of the liquid-sucking tube and the circumferential inside of the lower end of the overflow-storing tube are fixed with each other in a sealed manner.

The liquid-sucking tube is in a split-type structure; the liquid-sucking tube includes an upper positioning tube and a lower detachable tube; the upper end of the upper positioning tube is inserted into and fixed in the internal of the lower end of the overflow-storing tube; and the upper end of the lower detachable tube is cup joint and connected with the lower end of the upper positioning tube.

The circumferential outside of the upper positioning tube and the inside circumference of the lower end of the overflow-storing tube are fixed with each other in a sealed manner.

The upper end inner cavity of the upper positioning tube is in a conical structure tapering from the bottom up; and the lower end inner cavity of the lower detachable tube is in a conical structure tapering from the top down.

The upper end of the lower detachable tube is provided with a conical sleeve joint; the conical sleeve joint is in a conical structure tapering from the top down; and the upper end of the lower detachable tube is cup joint and connected with the circumferential outside of the lower end of the upper positioning tube via the conical sleeve joint.

The connecting tube between the top bulb and the overflow-storing tube is located in the middle or on one side between the top bulb and the overflow-storing tube.

A reinforcement strip is respectively provided on both sides of the connecting tube; and the upper and lower ends of the reinforcement strip are respectively connected between the top bulb and the overflow-storing tube.

The connecting tube, the overflow-storing tube, and the liquid-sucking tube are made of glass material or polymer material.

The top bulb is in a flat or ellipsoidal structure.

The present disclosure has following beneficial effects.

1. In the present disclosure, the upper and lower ends of the liquid-sucking tube are respectively designed as a conical structure, wherein the upper end inner cavity of the liquid-sucking tube is in a conical structure tapering from the bottom up, and the lower end inner cavity of the liquid-sucking tube is in a conical structure tapering from the top down, in this way, the sizes of the openings at the upper and lower ends of the liquid-sucking tube are greatly reduced, such that the acting force between the liquid and the solid at the upper and lower ends of the liquid-sucking tube is decreased, hereby greatly decreasing the volume of the concave part or convex part of the liquid, greatly improving the collection accuracy, and realizing easier extrusion and discharge as well as a small residue amount.

2. In the present disclosure, the liquid-sucking tube is designed as a split-type structure, including an upper positioning tube and a lower detachable tube, wherein the upper end of the upper positioning tube is inserted into and fixed in the internal of the lower end of the overflow-storing tube, and the upper end of the lower detachable tube is cup joint and connected with the lower end of the upper positioning tube. In this way, a lower detachable tube having a different volume can be used for replacement according to actual requirements, and in this way, flexible adjustment enabling various suction volumes can be realized.
3. In the present disclosure, the connecting tube between the top bulb and the overflow-storing tube is arranged on one side between the top bulb and the overflow-storing tube. The essence thereof is to eccentrically set the vent between the lower end of the connecting tube and the upper end of the overflow-storing tube, such that this air vent is located on one side of the upper end of the overflow-storing tube, hereby forming an eccentric air vent structure. In this way, if excess liquid is sucked because of an excessively applied force by an operator, the liquid will be blocked by the upper end of the overflow-storing tube during the upward movement, since the air vent departs from the upper end middle of the overflow-storing tube, wherein the probability of liquid directly flowing into the top bulb is greatly reduced.

DETAILED DESCRIPTION

The contents of the present disclosure will be further described in detail below with reference to the accompanying drawings.

Example 1

Figure 1:
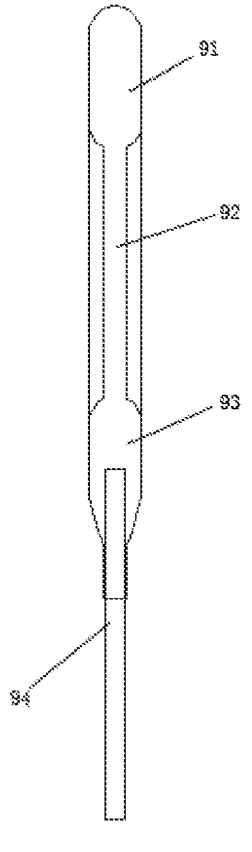
FIG. 1 is a schematic diagram of an existing structure.
Figure 2:
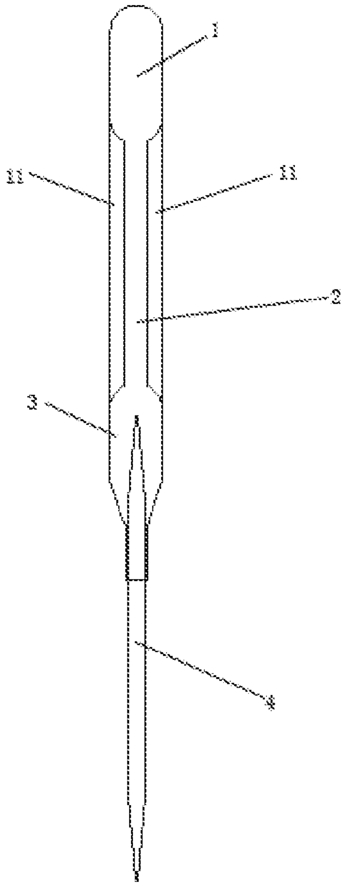
FIG. 2 is a structural schematic diagram of Example 1 of the present disclosure.
Figure 3:
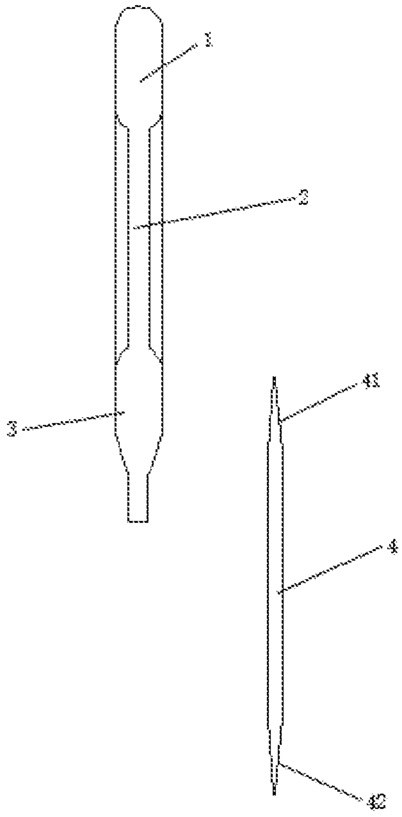
FIG. 3 is a schematic diagram showing a breakdown structure of FIG. 2 of the present disclosure.

FIG. 1 is a schematic diagram of an existing structure. As shown in FIG. 2 and FIG. 3, a fixed volume pipette comprises a top bulb 1, a connecting tube 2, an overflow-storing tube 3, and a liquid-sucking tube 4, wherein the lower end of the top bulb 1 is connected and assembled with the connecting tube 2, the lower end of the connecting tube 2 is connected and assembled with the overflow-storing tube 3, and the connecting tube 2 is located in the middle between the top bulb 1 and the overflow-storing tube 3; a liquid-sucking tube 4 is inserted into the internal of the lower end of the overflow-storing tube 3 in a sealed manner; the upper end of the liquid-sucking tube 4 is inserted and connected in the middle of the internal of the overflow-storing tube 3, and the lower end of the liquid-sucking tube 4 is located under the overflow-storing tube 3; an annular cavity is enclosed by the circumferential outside of the upper end of the liquid-sucking tube 4 and the circumferential inside of the lower end of the overflow-storing tube 3; and the inner cavities at upper and lower ends of the liquid-sucking tube 4 respectively are in a conical structure, wherein the upper end 41 of the liquid-sucking tube 4 is in a conical structure tapering from the bottom up, and the lower end 42 of the liquid-sucking tube 4 is in a conical structure tapering from the top down. Further, the liquid-sucking tube 4 is in an integrated structure; and the circumferential outside of the upper end of the liquid-sucking tube 4 and the circumferential inside of the lower end of the overflow-storing tube 3 are fixed with each other in a sealed manner. The fixing may be realized through glue, or sealed fixing may be realized through direct insertion, or other modes may also be selected. Further, a reinforcement strip 11 is respectively provided on both sides of the connecting tube 2; and the upper and lower ends of the reinforcement strip 11 are respectively connected between the top bulb 1 and the overflow-storing tube 3. Further, the connecting tube 2, the overflow-storing tube 3, and the liquid-sucking tube 4 are made of glass material or polymer material. Further, the top bulb 1 is in a flat or ellipsoidal structure.

In the present disclosure, the upper and lower ends of the liquid-sucking tube 4 are respectively designed as a conical structure, wherein the upper end 41 of the liquid-sucking tube 4 is in a conical structure tapering from the bottom up, and the lower end 42 of the liquid-sucking tube 4 is in a conical structure tapering from the top down, in this way, the sizes of the openings at the upper and lower ends of the liquid-sucking tube 4 are greatly reduced, such that the acting force between the liquid and the solid at the upper and lower ends of the liquid-sucking tube 4 is decreased, hereby greatly decreasing the volume of the concave part or convex part of the liquid, greatly improving the collection accuracy, and realizing easier extrusion and discharge as well as a small residue amount.

Example 2

Figure 4:
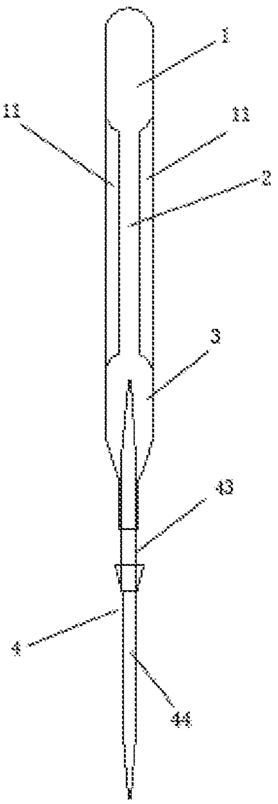
FIG. 4 is a structural schematic diagram of Example 2 of the present disclosure.
Figure 5:
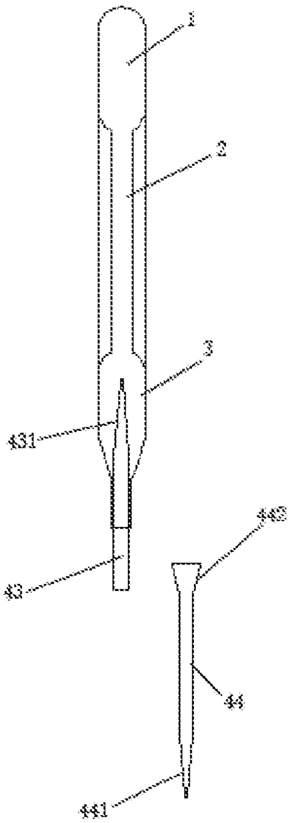
FIG. 5 is a schematic diagram showing a breakdown structure of FIG. 4 of the present disclosure.

FIG. 4 is a structural schematic diagram of Example 2 of the present disclosure. FIG. 5 is a schematic diagram showing a breakdown structure of FIG. 4 of the present disclosure. The present example refers to example 1, and the difference lies in the structure of the liquid-sucking tube. As shown in FIG. 4 and FIG. 5, the liquid-sucking tube 4 is in a split-type structure; the liquid-sucking tube 4 includes an upper positioning tube 43 and a lower detachable tube 44; the upper end of the upper positioning tube 43 is inserted into and fixed in the internal of the lower end of the overflow-storing tube 3; and the upper end of the lower detachable tube 44 is cup joint and connected with the lower end of the upper positioning tube 43. Further, the circumferential outside of the upper positioning tube 43 and the inside circumference of the lower end of the overflow-storing tube 3 are fixed with each other in a sealed manner. The sealed fixing may be realized through glue adhesion, or the sealing may be realized by direct tight insertion. Further, the upper end 431 of the upper positioning tube 43 is in a conical structure tapering from the bottom up; and the lower end 441 of the lower detachable tube 44 is in a conical structure tapering from the top down. Further, the upper end of the lower detachable tube 44 is provided with a conical sleeve joint 442; the conical sleeve joint 442 is in a conical structure tapering from the top down; and the upper end of the lower detachable tube 44 is cup joint and connected with the circumferential outside of the lower end of the upper positioning tube 43 via the conical sleeve joint 442.

In the present disclosure, the liquid-sucking tube 4 is designed as a split-type structure, including an upper positioning tube 43 and a lower detachable tube 44, wherein the upper end of the upper positioning tube 43 is inserted into and fixed in the internal of the lower end of the overflow-storing tube 3, and the upper end of the lower detachable tube 44 is cup joint and connected with the lower end of the upper positioning tube 43. In this way, a lower detachable tube 44 having a different volume can be used for replacement according to actual requirements, while the volume of the upper positioning tube 43 remains unchanged. In this way, flexible adjustment enabling various suction volumes can be realized.

Example 3

Figure 6:
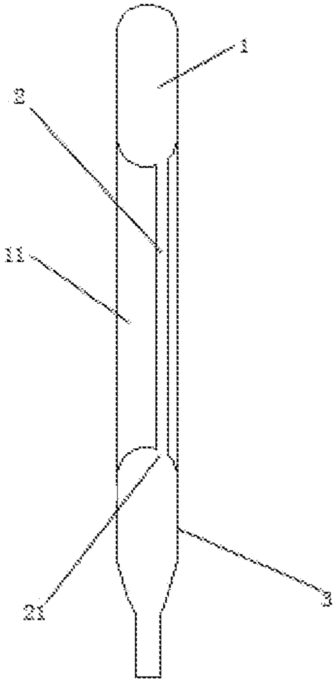
FIG. 6 is a structural schematic diagram of Example 3 of the present disclosure.

As shown in FIG. 6, this example refers to example 1, and the difference lies in that in the present disclosure, the connecting tube 2 is arranged in a location on one side of the middle between the top bulb 1 and the overflow-storing tube 3, hereby forming an eccentric air vent structure.

Example 4

Figure 7:
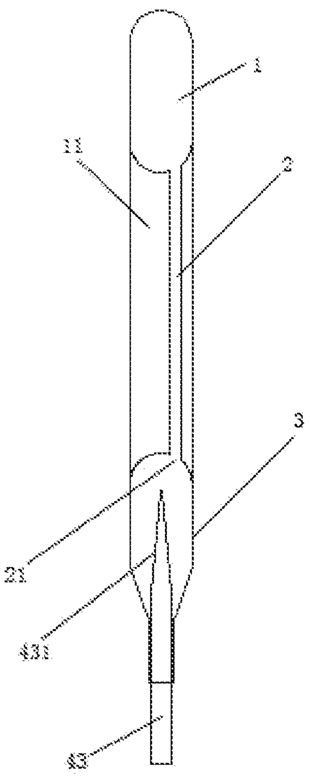
FIG. 7 is a structural schematic diagram of Example 4 of the present disclosure.

As shown in FIG. 7, this example refers to example 2, and the difference lies in that in the present disclosure, the connecting tube 2 is arranged in a location on one side of the middle between the top bulb 1 and the overflow-storing tube 3, hereby forming an eccentric air vent structure.

Through the design in the above examples 3 and 4, the probability of liquid directly flowing into the top bulb 1 due to excessive force application can be greatly reduced. In the present disclosure, the connecting tube 2 between the top bulb 1 and the overflow-storing tube 3 is arranged on one side between the top bulb 1 and the overflow-storing tube 3. The essence thereof is to eccentrically set an air vent 21 between the lower end of the connecting tube 2 and the upper end of the overflow-storing tube 3, such that this air vent 21 is located on one side of the upper end of the overflow-storing tube 3, hereby forming an eccentric air vent structure. In this way, if excess liquid is sucked because of an excessively applied force by an operator, the liquid will be blocked by the upper end of the overflow-storing tube 3 during the upward movement, since the air vent 21 departs from the upper end middle of the overflow-storing tube 3, wherein the probability of liquid directly flowing into the top bulb 1 is greatly reduced.

The above mentioned is merely preferred embodiments of the present disclosure, and is not intended to limit the present disclosure. Any modifications, equivalent substitutions and improvements made within the spirit and principle of the present disclosure shall all be covered in the scope of protection of the present disclosure.

The invention claimed is:

1. A fixed volume pipette, comprising:

a top bulb;

a connecting tube;

an overflow-storing tube; and a liquid-sucking tube, wherein a lower end of the top bulb is connected and assembled with the connecting tube, a lower end of the connecting tube is connected and assembled with the overflow-storing tube, and the connecting tube is connected between the top bulb and the overflow-storing tube; the liquid-sucking tube is inserted into an interior of a lower end of the overflow-storing tube in a sealed manner; an upper end of the liquid-sucking tube is inserted and connected in a middle of an interior of the overflow-storing tube, and a lower end of the liquid-sucking tube is located under the overflow-storing tube; an annular cavity is enclosed by a circumferential outside of an upper end of the liquid-sucking tube and a circumferential inside of the overflow-storing tube; and inner cavities at upper and lower ends of the liquid-sucking tube respectively are in a conical structure, wherein an upper end inner cavity of the inner cavities of the liquid-sucking tube is in a conical structure tapering from a bottom of the liquid-sucking tube upwards, and a lower end inner cavity of the inner cavities of the liquid-sucking tube is in a conical structure tapering from a top of the liquid-sucking tube downwards;

wherein the top bulb and the overflow-storing tube are concentrically provided, and the connecting tube between the top bulb and the overflow-storing tube is located at a position deviated from a central axis of the fixed volume pipette and is an eccentric air vent structure relative to the top bulb and the overflow-storing tube; and wherein a reinforcement strip is respectively provided on opposing sides of the connecting tube; and upper and lower ends of the reinforcement strip are respectively connected to and between the top bulb and the overflow-storing tube.

2. The fixed volume pipette according to claim 1, wherein the liquid-sucking tube is integrated with the overflow-storing tube; and the circumferential outside of the upper end of the liquid-sucking tube and a circumferential inside of a lower end of the overflow-storing tube are fixed with each other in a sealed manner.

3. The fixed volume pipette according to claim 1, wherein the liquid-sucking tube is in a split-type structure; the liquid-sucking tube comprises an upper positioning tube and a lower detachable tube; an upper end of the upper positioning tube is inserted into and fixed in the interior of the lower end of the overflow-storing tube; and an upper end of the lower detachable tube comprises a sleeve joint connected with a lower end of the upper positioning tube.

4. The fixed volume pipette according to claim 3, wherein a circumferential outside of the upper positioning tube and an inside circumference of the lower end of the overflow-storing tube are fixed with each other in a sealed manner.

5. The fixed volume pipette according to claim 3, wherein an upper end inner cavity of the upper positioning tube is in a conical structure tapering from a bottom of the upper positioning tube upwards; and a lower end inner cavity of the lower detachable tube is in a conical structure tapering from a top of the lower detachable tube downwards.

6. The fixed volume pipette according to claim 3, wherein the sleeve joint is a conical sleeve joint; the conical sleeve joint is in a conical structure tapering from a top of the lower detachable tube downwards; and the upper end of the lower detachable tube is connected with a circumferential outside of the lower end of the upper positioning tube via the conical sleeve joint.

7. The fixed volume pipette according to claim 1, wherein the connecting tube, the overflow-storing tube, and the liquid-sucking tube are made of glass material or polymer material.

8. The fixed volume pipette according to claim 2, wherein the connecting tube, the overflow-storing tube, and the liquid-sucking tube are made of glass material or polymer material.

9. The fixed volume pipette according to claim 3, wherein the connecting tube, the overflow-storing tube, and the liquid-sucking tube are made of glass material or polymer material.

* * * * *